Jan. 1, 1963   L. C. McCLURE, SR   3,070,850
EXPANSIBLE TRAILER
Filed March 15, 1960   4 Sheets-Sheet 1

INVENTOR.
Louis C. McClure Sr.
BY
Albert J. Fihe
ATTORNEY

Jan. 1, 1963   L. C. McCLURE, SR   3,070,850
EXPANSIBLE TRAILER
Filed March 15, 1960   4 Sheets-Sheet 2

INVENTOR.
Louis C. McClure Sr.
BY
ATTORNEY

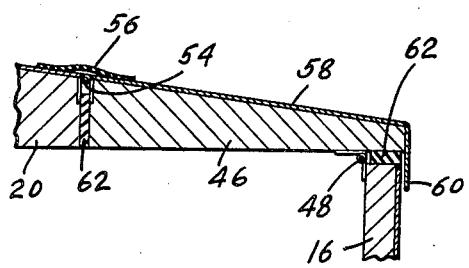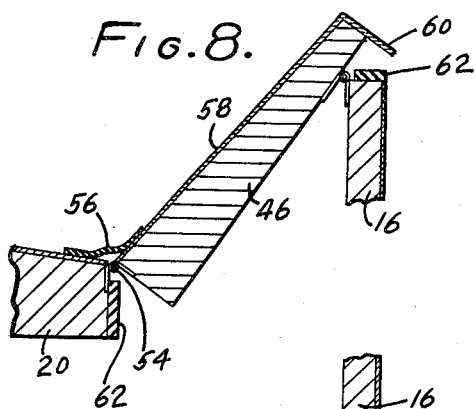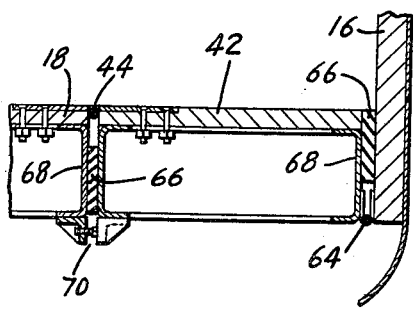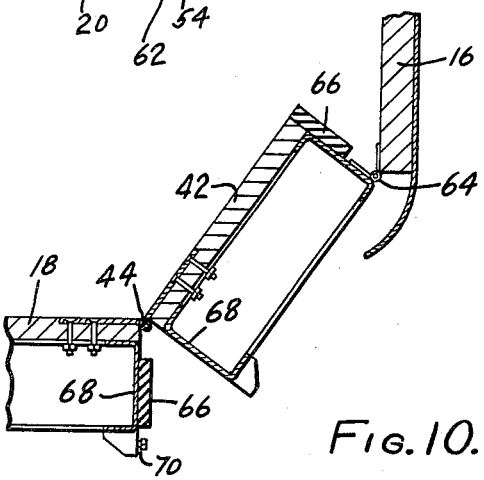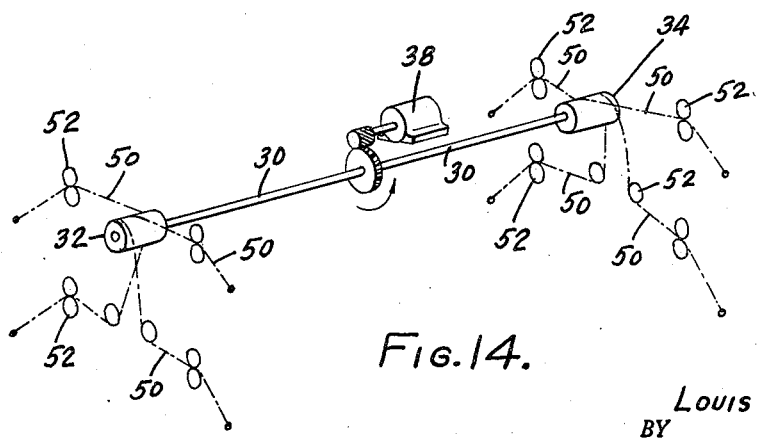

Jan. 1, 1963 L. C. McCLURE, SR 3,070,850
EXPANSIBLE TRAILER
Filed March 15, 1960 4 Sheets-Sheet 4

INVENTOR.
Louis C. McClure Sr.
BY
ATTORNEY

United States Patent Office 3,070,850
Patented Jan. 1, 1963

3,070,850
EXPANSIBLE TRAILER
Louis C. McClure, Sr., Lancaster, Calif.
(1803 Sweetbrier St., Palmdale, Calif.)
Filed Mar. 15, 1960, Ser. No. 15,195
2 Claims. (Cl. 20—2)

This invention relates to an improved expansible trailer and has for one of its principal objects the provision of a device of the class described which is so constructed that it will meet all of the requirements of State motor vehicle departments so far as travel on highways is concerned, but which, when not in transit, can be expanded to provide spacious living quarters.

One of the important objects of this invention is to provide a house trailer which is of a regular traveling width when being transported from place to place, but which can, with a minimum expenditure of time and labor, be converted to almost double its original width, whereby very roomy compartments result for complete living accommodations.

Another and still further important object of the invention is to provide an expansible vehicular enclosure comprising a symmetrical balanced laterally shiftable body, especially suited for use in conjunction with the construction of mobile homes, truck and trailer combinations and similar devices.

Yet another object of the invention is to provide a mobile house trailer or the like which allows greater freedom of interior arrangements by eliminating undesirable longitudinal partitions and overhead cross-beams, which is inherently stronger than any devices now on the market, while at the same time being light in weight and efficient and simple in operation.

A still further object relates to the construction of an expansible vehicle which, in case of emergency, can be readily moved while in its expanded position, even though normal contraction to a traveling width can be effected in relatively short sp;ace of time in any event.

Other and further important objects of the invention will be apparent from the disclosures in the accompanying drawings and following specification.

The invention, in a preferred form, is illustrated in the drawings and hereinafter more fully described.

In the drawings:

FIGURE 7 is a detail sectional view of a portion of the roof structure of the expansible trailer of this invention, showing the same in expanded relationship.

FIGURE 8 is a view of the same elements illustrated in FIGURE 7, but depicting the construction partially folded or contracted.

FIGURE 9 is a somewhat enlarged sectional view of a portion of the floor structure of the expansible trailer of this invention and shows the same in expanded relationship.

FIGURE 10 is likewise a sectional view, illustrating the parts shown in FIGURE 9, but moved partially through the contracting operational shift. This view conforms to the showing of FIGURE 8 so far as simultaneously moving parts of the structure are concerned.

FIGURE 14 is a diagrammatic view, illustrating one form of cable, drum and motor arrangement for accomplishing the contracting and expanding movements of the trailer.

As shown in the drawings:

Figure 1:
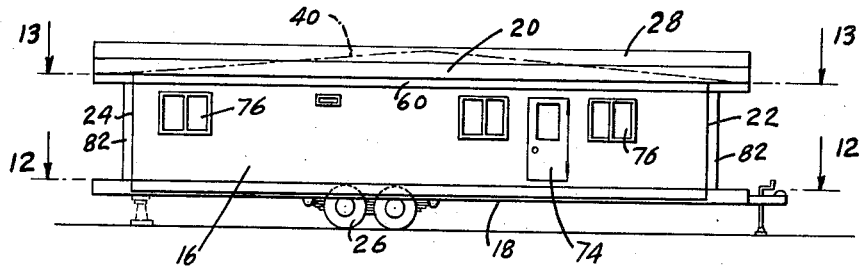
FIGURE 1 is a side elevation of the improved expansible trailer of this invention, illustrating one preferred form thereof and showing the same in expanded position for use as living quarters.
Figure 2:
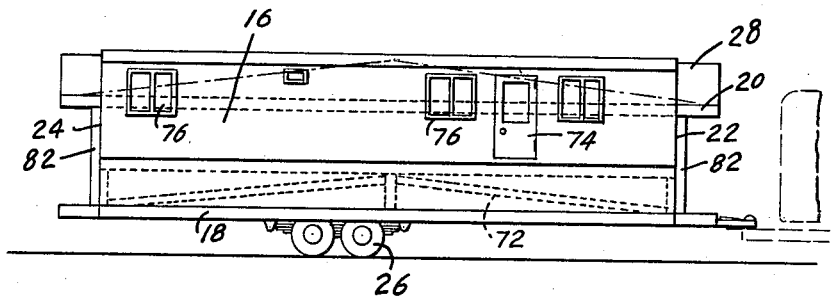
FIGURE 2 is a side elevaton of the trailer of this invention, illustrating the same in collapsed or contracted position for movement along a road or highway.
Figure 3:
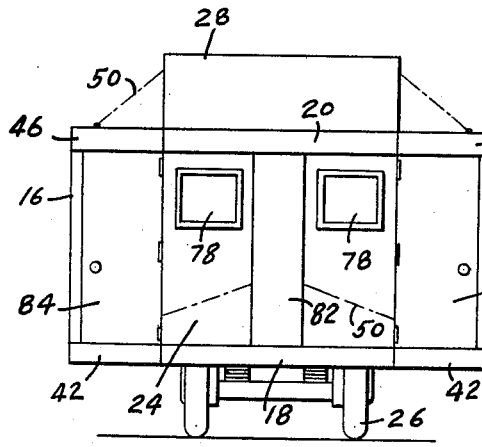
FIGURE 3 is an end elevation of the trailer, as depicted in FIGURE 1.
Figure 4:
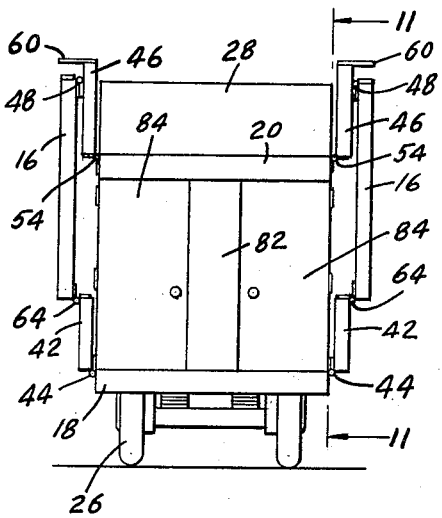
FIGURE 4 is a view of the same end of the trailer, but showing the same in collapsed or contracted position for transit.

The reference numerals 16 indicate generally the side walls of the improved expansible trailer of this invention, which has a main floor portion 18, a top 20, front and rear end walls 22 and 24, respectively, and the entire device is supported on wheels 26.

Figure 13:
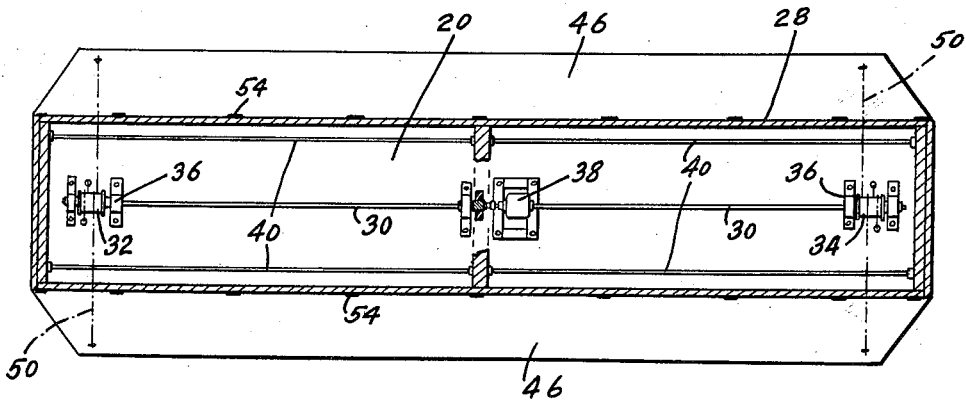
FIGURE 13 is a section on the line 13—13 of FIGURE 1.

The roof portion 20 is surrounded by a top 28 (FIGURES 5 and 6), which provides an enclosure for a shaft 30 which extends longitudinally of the trailer, terminating in drums 32 and 34, respectively, as best shown in FIGURE 13. The shaft is mounted in suitable bearings 36 and can be rotated by a motor 38 or a hand-cranked winch may be provided. Struts 40 reinforce the roof housing construction.

The main floor 18 is provided with lateral extensions 42, one on each side of the same length as the main floor. These are of equal width and are hinged at 44 to the main floor 18, whereby they can be pulled up into the position shown in FIGURE 6 for a simple contracting movement of the sides, bottom and top extensions of the trailer. These extensions are preferably of the same thickness as the main floor.

Figure 5:
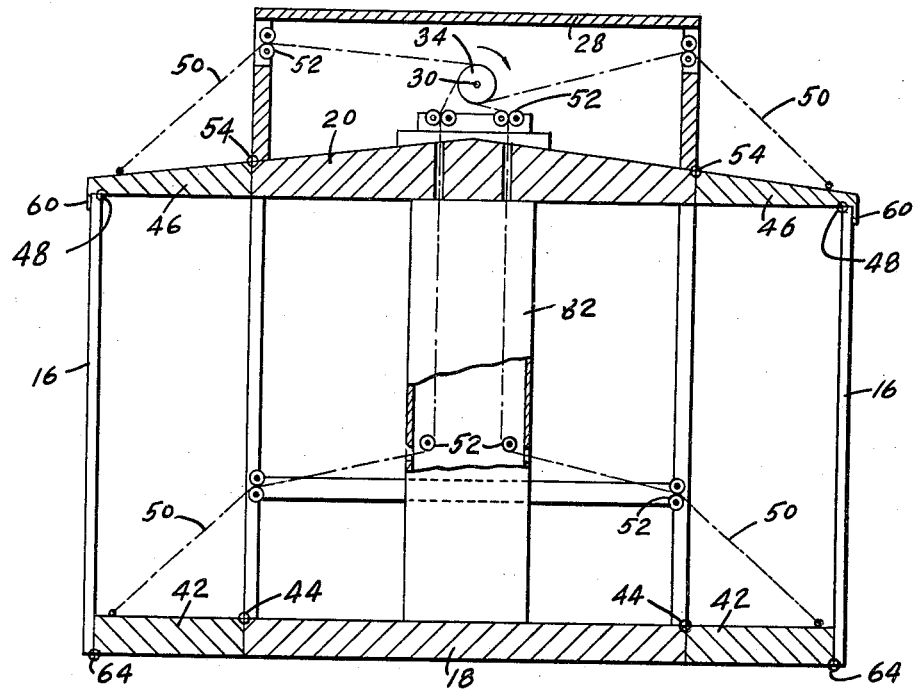
FIGURE 5 is a detail view, partly in section and partly diagrammatic, ilustrating the trailer body in expanded position and corresponding to the showing of FIGURE 3.
Figure 6:
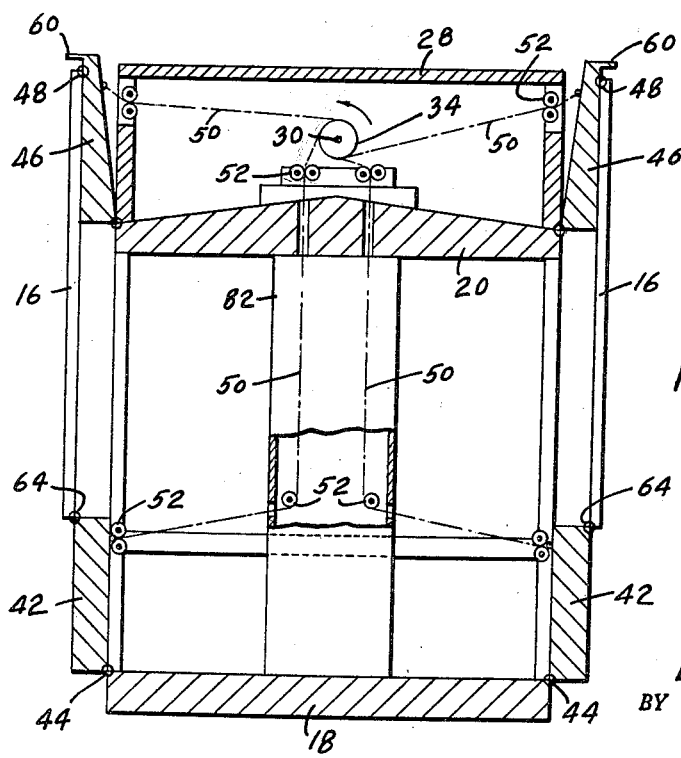
FIGURE 6 is a similar partial sectional and diagrammatic view of the body of the trailer of this invention, showing the same in contracted position and conforming to the illustration of FIGURE 4.
Figure 11:
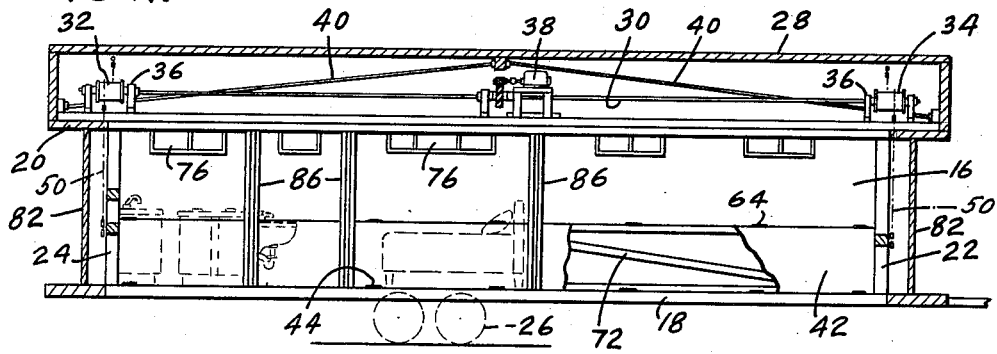
FIGURE 11 is a further detailed view of the trailer of this invention with one wall removed and showing the same in contracted relationship with some relatively fixed interior fittings. This view is taken along the plane of the line 11—11 of FIGURE 4, looking in the direction indicated by the arrows.

As best shown in FIGURE 5, the roof or ceiling 20 has extensions 46 conforming to the extensions 42 of the floor, these being hinged at 48 for simultaneous up and down movement with the floor and side portions.

This movement is effected by a series of cables 50 and, as best shown in FIGURE 14, these cables pass over pulleys 52 placed at strategic points in the trailer body and are so wound upon the drums 34 by operation of the motor 38 that a simultaneous movement of all the related parts is simply and efficiently accomplished, regardless of whether the same is a contracting or expanding operation.

Referring now to FIGURES 7 and 8, it will be noted that the lateral extensions 46 of the ceiling or top portion 20 are hinged therethrough at 54, and a strip of some flexible water-proof material 56 covers the hinge to protect the same against the weather. Some suitable further protective cover 58 is also employed, as shown, and this extends downwardly at 60 to protect the joint between the extension 46 and the side panel 16. Resilient bumper and sealing elements 62 are provided at strategic points.

Figure 12:
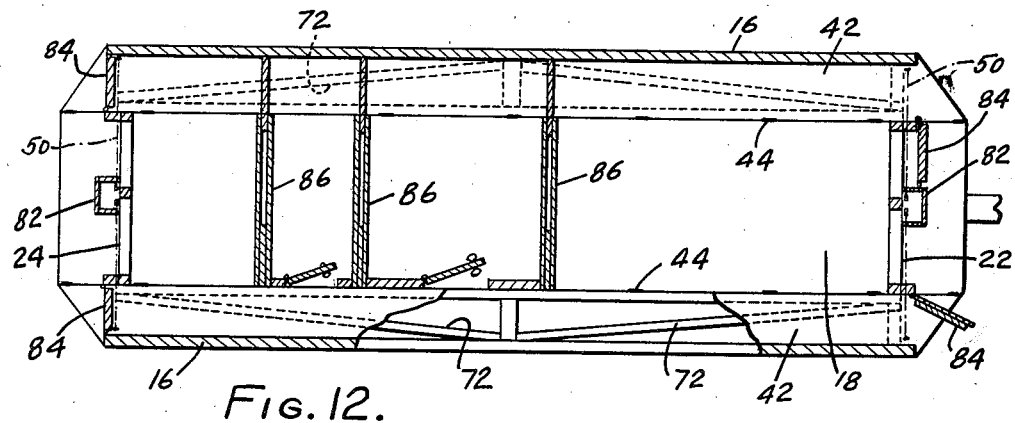
FIGURE 12 is a sectional view, taken on the line 12—12 of FIGURE 1, looking downwardly and showing some additional features.

The construction and operation of the corresponding floor portions 18—42 is best shown in FIGURES 9 and 10; and, in this case, the side panel 16 is hinged to the floor extension 42 at 64 with resilient sealing elements 66 similar to the elements 62 inserted to protect the joints. Suitable channels 68 and adjustable stop elements 70 are provided to assure of a substantial and level floor construction, and the floor portions may be further reinforced by struts or rods 72, as best shown in FIGURE 12.

The sides of the trailer are provided with usual doors 74 and windows 76, and the location and operation of these depends entirely upon the manufacturer or purchaser. Windows 78 are in the front of the trailer, and other doors and windows may be included. Housings 82 for the cables 50 are provided at each end of the trailer. These may be integral with the end walls or other laterally oriented walls or partitions, such as 22 and 24. Closures 84 are hinged to the end portions for cooperation with the sides 16 when the same are lowered.

Partitions 86 can be inside the trailer, as desired, and the usual amount of interior equipment can be installed. Anything which is supported on the extended floor portions 42 must be readily shiftable off these portions when retracted.

The apparatus of this invention is symmetrical about both its lateral and longitudinal axes which, in itself, provides a more efficient construction which is well balanced for traveling and well adapted to freedom of architectural treatment and attractive appearance.

This balance about the longitudinal axis exists in both expanded and contracted positions, because both sides are simultaneously and equally moved. The distribution of the total weight is the same in all positions which, furthermore, facilitates the set-up since no additional blocks, jacks or other stabilizers are required.

The seals are simple, yet efficient and automatic in operation. They may be composed of any suitable material and are easily replaced if damaged or worn. The resilient sections at the joints may also be composed of rubber, plastic or synthetic and are automatically compressed with full rotation of the juxtaposed sections. The alignment is also automatic with no further adjustment necessary.

It will be seen that the expansible trailer of this invention allows greater freedom of interior arrangements because of the elimination of longitudinal partitions and overhead beams which usually protrude down into the unit. In the trailer of this invention, laterally oriented walls, partitions, both fore and aft, can be arranged, as desired, and always perform double functions, namely, outlining various rooms or other enclosures and also providing support for the roof section.

The fact that the floor sections are utilized to form a longitudinal truss when the unit is collapsed, makes the trailer inherently strong, which is a tremendous advantage, especially considering the vibration to which such a unit is normally subjected in transit.

When expanded, the floor sections, in conjunction with the main frame and the fixed roof section, also provide additional bracing to adequately provide for additional weight of the added floor area while, at the same time, permitting the use of relatively light material in the main framework.

No special tools or skills are required for operating the improved expansible vehicular enclosure of this invention, and both a motor and a hand-operated winch can be provided so that where electrical current is not available, the expanding and contracting movements can still be accomplished with little or no difficulty.

I am aware that many changes may be made and numerous details of construction varied throughout a wide range without departing from the principles of this invention; and I, therefore, do not propose limiting the patent granted hereon otherwise than as necessitated by the prior art.

I claim as my invention:

1. An elongated transversely expansible trailer comprising a floor structure and a roof structure each having a flat substantially vertical edge, a pair of end walls fixedly supporting said roof structure above said floor structure, a roof extension and a floor extension each having a flat inner edge, each of said extension being hingedly secured at its upper inner margin to said roof and floor structure respectively, a substantially vertically oriented side panel hingedly secured to the outer margins of said floor extension and said floor extension in collapsible parallelogram form whereby in contracted position said side panel, floor extension and roof extension are substantially vertically oriented, and in expanded position, said side panel is substantially vertically oriented and said floor extension and said roof extension are substantially horizontally oriented with said flat edges of said extensions abutting said flat edges of said structures, said floor extension and said roof extension being vertically oriented in said contracted position to longitudinally brace said trailer, and actuating means including a cable connected adjacent their outer edges for upwardly pivoting said roof extension and said floor extension simultaneously about their inner margins from said expanded position to said contracted position and holding the same in said contracted position.

2. An elongated transversely expansible trailer comprising a floor structure and a roof structure each having flat substantially vertical edges, a pair of end walls fixedly supporting said roof structure above said floor structure, a pair of roof extensions and a pair of floor extensions each having a flat inner edge, each said extension being hingedly secured at its upper inner margin to said roof and floor structures respectively, a pair of vertically oriented side panels hingedly secured respectively to the outer margins of said pairs of roof extensions and floor extensions to define a pair of trailer portions on opposite sides of said trailer, each trailer portion being of collapsible parallelogram form and having a contracted position wherein said side panel, floor extension and roof extension are substantially vertically oriented, and having an expanded position wherein said floor extension and roof extension are substantially horizontally oriented with the flat edges of said extensions abutting the flat edges of said structures and said side panel is substantially vertically oriented, said pairs of floor extensions and roof extensions each in its substantially vertically oriented position assuming loads from said floor structure and said roof structure through the hinge connections thereto to brace said floor structure and said roof structure against longitudinal bending, and actuating means including a cable connected adjacent their outer margins for upwardly pivoting the roof and floor extensions of said trailer portions simultaneously about their inner margins from said expanded position to said contracted position and holding the same in said contracted position.

References Cited in the file of this patent

UNITED STATES PATENTS

| | | |
|---|---|---|
| 1,796,112 | McArthur | Mar. 10, 1931 |
| 1,964,894 | Rohne | July 3, 1934 |
| 2,155,876 | Stout | Apr. 25, 1939 |
| 2,167,557 | Stout | July 25, 1939 |
| 2,298,619 | Gorton | Oct. 13, 1942 |
| 2,323,106 | Whiteman | June 29, 1943 |
| 2,765,499 | Couse | Oct. 9, 1956 |
| 2,860,384 | Wait et al. | Nov. 18, 1958 |
| 2,862,253 | Place et al. | Dec. 2, 1958 |
| 2,890,907 | Briskie et al. | June 16, 1959 |
| 2,906,556 | Cantele et al. | Sept. 29, 1959 |

FOREIGN PATENTS

| | | |
|---|---|---|
| 143,338 | Great Britain | May 27, 1920 |